US010515572B1

(12) United States Patent
Seefried

(10) Patent No.: US 10,515,572 B1
(45) Date of Patent: Dec. 24, 2019

(54) DECORATION SUPPORT POLE

(71) Applicant: Catherine Seefried, Mission Viejo, CA (US)

(72) Inventor: Catherine Seefried, Mission Viejo, CA (US)

( * ) Notice: Subject to any disclaimer, the term of this patent is extended or adjusted under 35 U.S.C. 154(b) by 0 days.

(21) Appl. No.: 16/031,280

(22) Filed: Jul. 10, 2018

(51) Int. Cl.
*F16M 11/00* (2006.01)
*G09F 15/00* (2006.01)
*A47F 5/04* (2006.01)

(52) U.S. Cl.
CPC ............ *G09F 15/0075* (2013.01); *A47F 5/04* (2013.01)

(58) Field of Classification Search
CPC .............................. G09F 17/00; B60Q 1/2657
See application file for complete search history.

(56) References Cited

U.S. PATENT DOCUMENTS

| | | | | | |
|---|---|---|---|---|---|
| 3,664,626 | A | | 5/1972 | Sneller | |
| 4,953,713 | A | | 9/1990 | Yaffe | |
| 5,904,258 | A | | 5/1999 | Farmer | |
| D533,111 | S | | 12/2006 | Rahman | |
| 7,152,998 | B2 | | 12/2006 | Rahman | |
| 2005/0237165 | A1 | * | 10/2005 | Shimoni | B60Q 1/2657 340/425.5 |
| 2007/0089338 | A1 | * | 4/2007 | Barnhouse | G09F 17/00 40/604 |
| 2007/0111633 | A1 | | 5/2007 | Novak | |
| 2008/0050541 | A1 | | 2/2008 | Trowbridge | |
| 2016/0063904 | A1 | * | 3/2016 | Heath | G09F 17/00 362/545 |

FOREIGN PATENT DOCUMENTS

| | | |
|---|---|---|
| DE | 202004008150 | 10/2004 |

* cited by examiner

*Primary Examiner* — Amy J. Sterling

(57) ABSTRACT

The decoration support pole is configured for use with celebratory activities. The decoration support pole is configured for use with a cubicle. The decoration support pole attaches to the wall of a cubicle such that the decoration support pole projects above the wall of the cubicle in a visible manner. The festive adornments are attached to the decorative support pole in support of a celebration. The decoration support pole is further illuminated to further support the celebration. The decoration support pole comprises a stanchion, a stanchion cap, a clip, and a festive illumination. The clip and the stanchion cap attach the stanchion to the cubicle wall. The festive illumination installs in the stanchion. The stanchion is a support structure that separates the clip from the stanchion cap. The festive illumination is an electric circuit that illuminates the stanchion.

18 Claims, 5 Drawing Sheets

DECORATION SUPPORT POLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sports, games, and amusements, more specifically, an amusement accessory comprising a pole.

SUMMARY OF INVENTION

The decoration support pole is configured for use with celebratory activities. The decoration support pole is configured for use with a cubicle. The decoration support pole attaches to the wall of a cubicle such that the decoration support pole projects above the wall of the cubicle in a visible manner. The festive adornments are attached to the decorative support pole in support of a celebration. The decoration support pole is further illuminated to further support the celebration. The decoration support pole comprises a stanchion, a stanchion cap, a clip, and a festive illumination. The clip and the stanchion cap attach to the stanchion. The festive illumination installs in the stanchion. The stanchion is a support structure that separates the clip from the stanchion cap. The festive illumination is an electric circuit that illuminates the stanchion.

These together with additional objects, features and advantages of the decoration support pole will be readily apparent to those of ordinary skill in the art upon reading the following detailed description of the presently preferred, but nonetheless illustrative, embodiments when taken in conjunction with the accompanying drawings.

In this respect, before explaining the current embodiments of the decoration support pole in detail, it is to be understood that the decoration support pole is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the decoration support pole.

It is therefore important that the claims be regarded as including such equivalent construction insofar as they do not depart from the spirit and scope of the decoration support pole. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
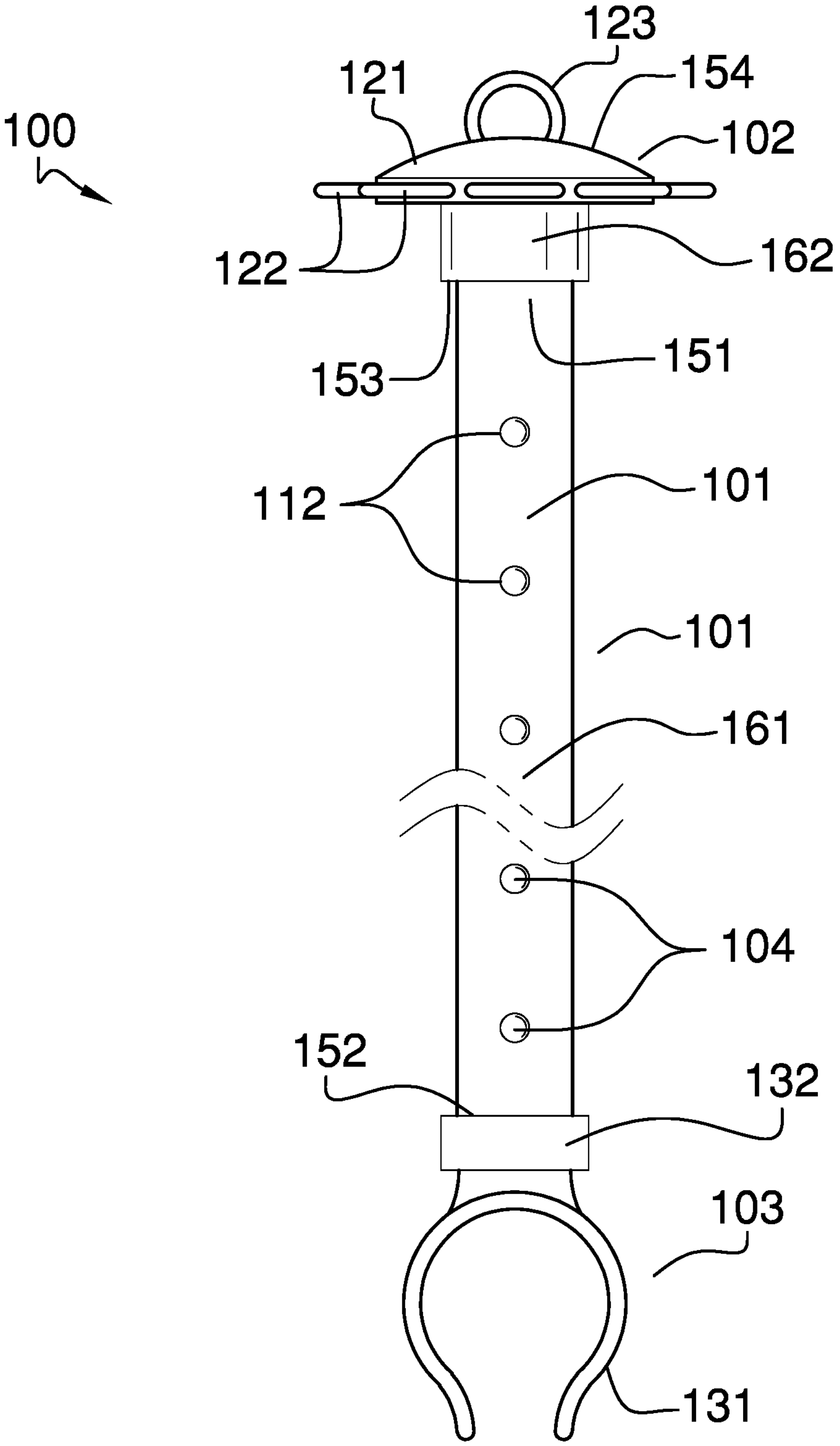
FIG. 1 is a front view of an embodiment of the disclosure.
Figure 2:
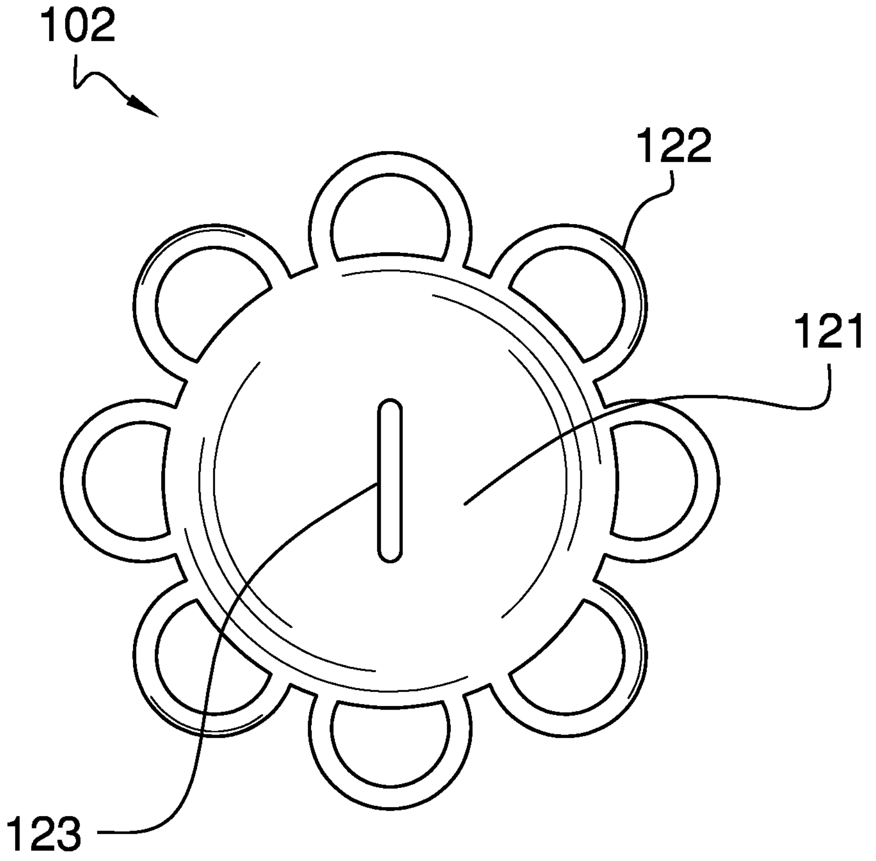
FIG. 2 is a side view of an embodiment of the disclosure.
Figure 3:
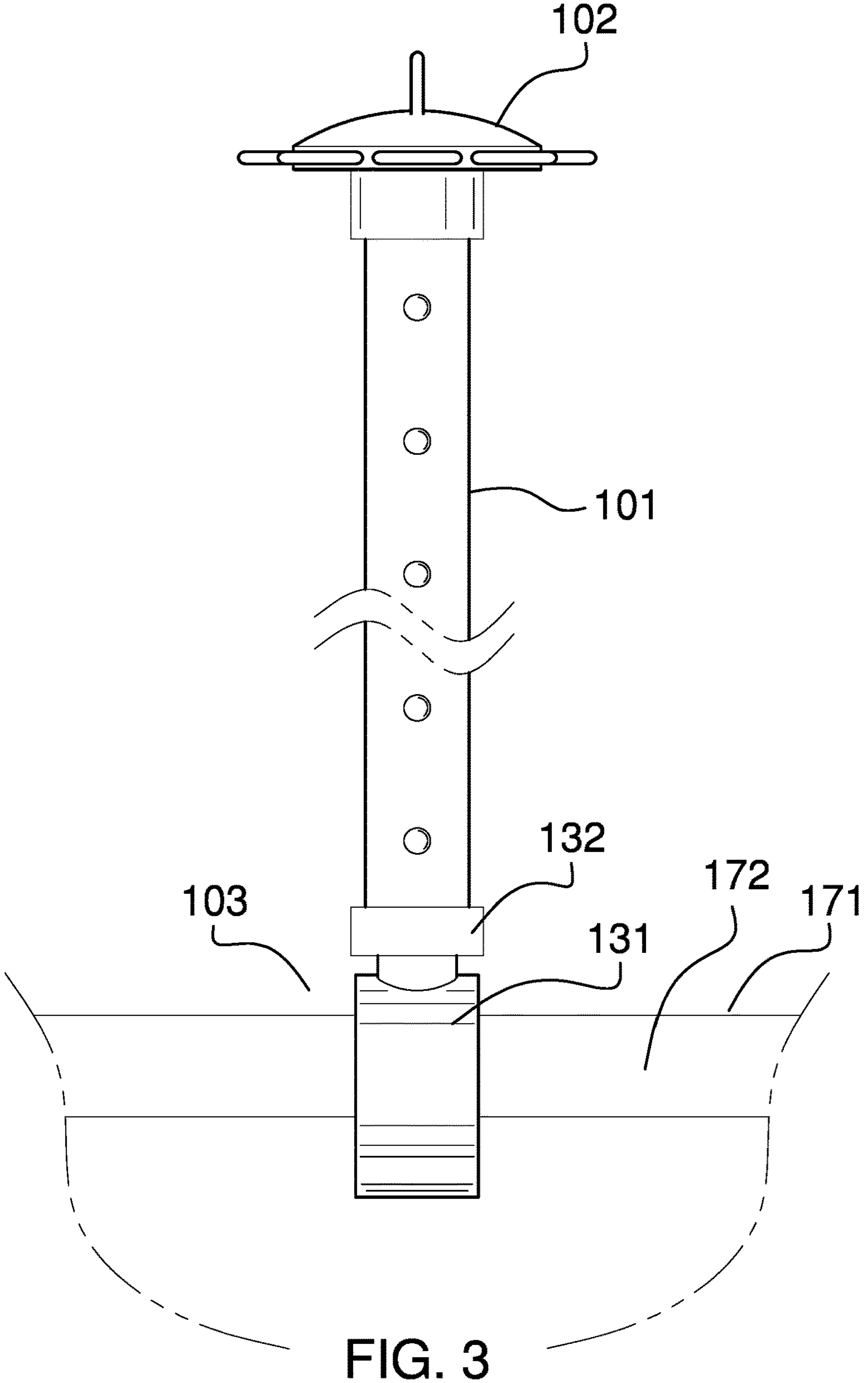
FIG. 3 is an in-use view of an embodiment of the disclosure.
Figure 4:
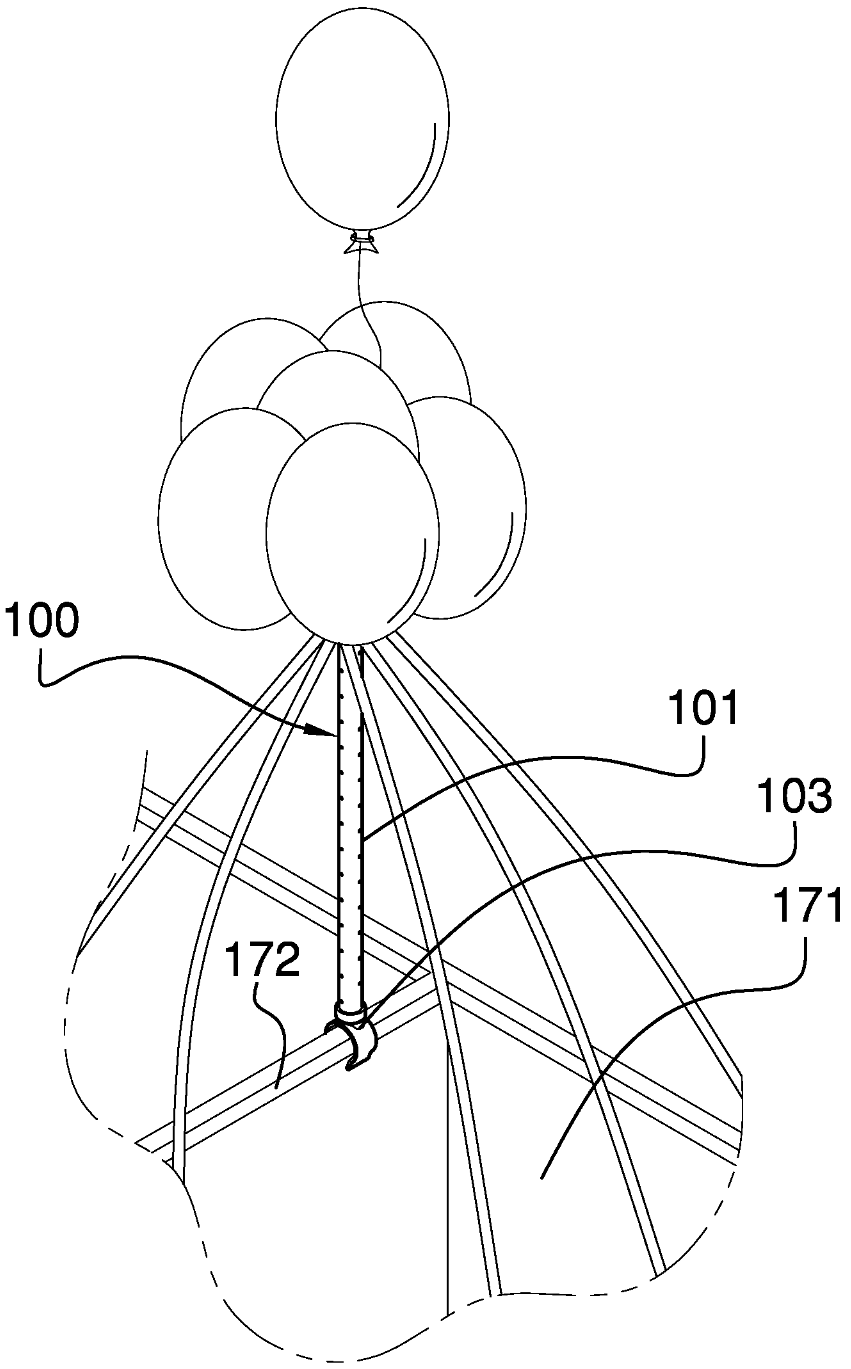
FIG. 4 is an in-use view of an embodiment of the disclosure.
Figure 5:
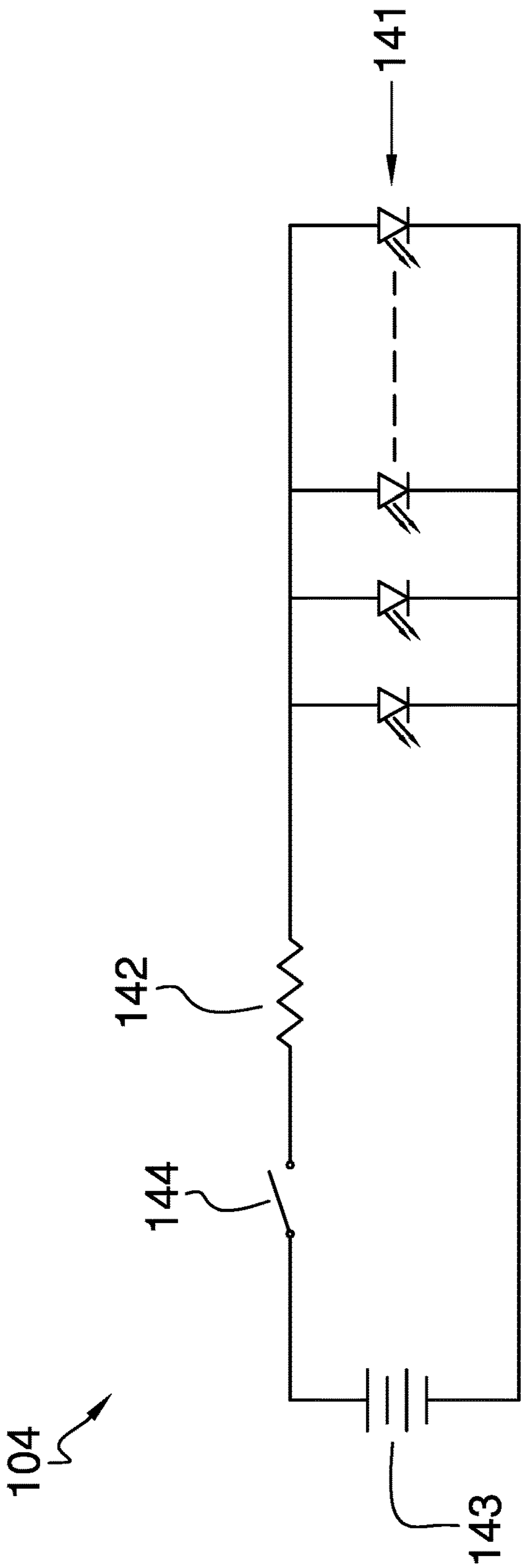
FIG. 5 is a schematic view of an embodiment of the disclosure.

Detailed reference will now be made to one or more potential embodiments of the disclosure, which are illustrated in FIGS. 1 through 5.

The decoration support pole 100 (hereinafter invention) is configured for use with celebratory activities. The invention 100 is configured for use with a cubicle 171. The invention 100 attaches to the wall 172 of a cubicle 171 such that the invention 100 projects above the wall 172 of the cubicle 171 in a visible manner. One or more festive adornments are attached to the decorative support pole in support of a celebration. The invention 100 is further illuminated to further support the celebration. The invention 100 comprises a stanchion 101, a stanchion 101 cap 102, a clip 103, and a festive illumination 104. The clip 103 and the stanchion 101 cap 102 attach to the stanchion 101. The festive illumination 104 installs in the stanchion 101. The stanchion 101 is a support structure that separates the clip 103 from the stanchion 101 cap 102. The festive illumination 104 is an electric circuit that illuminates the stanchion 101.

The stanchion 101 is an extension structure. The stanchion 101 raises the stanchion 101 cap 102 above the cubicle 171 wall 172 such that the stanchion 101 cap 102 is readily visible in the vicinity of the cubicle 171. The stanchion 101 is a vertically oriented structure. The stanchion 101 comprises a bollard 111 and a plurality of apertures 112. The bollard 111 is further defined with a first end 151, a second end 152, and a first lateral face 161. The first end 151 is the end of the bollard 111 with the highest elevation. The second end 152 is the end of the bollard 111 that is distal from the first end 151.

The bollard 111 is a hollow prism-shaped tube. The bollard 111 forms the extension structure that raises the stanchion 101 cap 102 above the cubicle 171 wall 172.

The plurality of apertures 112 are a plurality of channels that are formed through the first lateral face 161 of the bollard 111. The plurality of apertures 112 receive and display the illuminative elements of the festive illumination 104.

The stanchion 101 cap 102 is a headpiece. The stanchion 101 cap 102 attaches to the highest point of the stanchion 101. The stanchion 101 cap 102 serves as an anchor point for the one or more festive adornments that are displayed in support of the celebration. The one or more festive adornments include, but are not limited to, balloons, signage, banners, and streamers. The stanchion 101 cap 102 comprises a top piece 121, a plurality of lateral anchor points 122, and a superior anchor point 123. The top piece 121 is further defined with an open end 153, a closed end 154, and a second lateral face 162. The open end 153 is the end of the top piece 121 that is distal from the capped end 154. The closed end 154 is the end of the top piece 121 that is capped.

The top piece 121 is a capped tube. The top piece 121 is geometrically similar to the bollard 111 such that the first end 151 of the bollard 111 inserts into the open end 153 of the top piece 121. The bollard 111 supports the top piece 121 above the cubicle 171 wall 172.

The plurality of lateral anchor points 122 attach to the second lateral face 162 of the top piece 121. Each of the plurality of lateral anchor points 122 is a ring structure. Each of the plurality of lateral anchor points 122 is an anchor point. The superior anchor point 123 is a loop that is formed on the closed end 154 of the top piece 121. A festive adornment selected from the one or more festive adornments will attach to an anchor point selected from the group consisting of the plurality of lateral anchor points 122 and the superior anchor point 123.

The clip 103 is a spring-loaded structure. The clip 103 attaches the bottom end of the stanchion 101 to the cubicle 171 wall 172. The clip 103 attaches the stanchion 101 to the cubicle 171 wall 172 such that the stanchion 101 projects away from the cubicle 171 wall 172 in a direction opposite to but parallel with the direction of the force of gravity. The clip 103 comprises a cantilever V spring 131 and a decorative ledge 132.

The cantilever V spring 131 is a spring structure that attaches to the second end 152 of the bollard 111. The cantilever V spring 131 is a fastening device that attaches the second end 152 of the bollard 111 to the cubicle 171 wall 172. The cantilever V spring 131 is commercially available.

The decorative ledge 132 is a ring. The bollard 111 inserts through the decorative ledge 132 such that the decorative ledge 132: 1) is adjacent to the cantilever V spring 131; and, 2) is proximal to the first end 151 of the bollard 111 relative to the cantilever V spring 131. The decorative ledge forms a supporting surface upon which a festive adornment selected from the one or more festive adornments can rest.

The festive illumination 104 is an electric circuit. The festive illumination 104 is a lamp. The festive illumination 104 illuminates the stanchion 101 such the attention of people in proximity to the cubicle 171 will be directed towards the celebratory activities at the cubicle 171. The festive illumination 104 comprises a plurality of LEDs 141, a limit resistor 142, a battery 143, and a switch 144.

Each of the plurality of LEDs 141 is a commercially available electrical device that forms an illuminating element of the festive illumination 104. There is a one to one correspondence between the plurality of LEDs 141 and the plurality of apertures 112. Each LED selected from the plurality of LEDs 141 installs in an aperture selected from the plurality of apertures 112 such that the illumination of the selected LED is visible through the selected aperture. The limit resistor 142 is an electrical device that is installed in series with the plurality of LEDs 141. The limit resistor 142 limits the flow of electricity through the plurality of LEDs 141. The battery 143 is a chemical device. The battery 143 generates the electricity required to power the plurality of LEDs 141. The switch 144 is an electrical device. The switch 144 controls the flow of electricity from the battery 143 to the plurality of LEDs 141 and the limit resistor 142.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Battery: As used in this disclosure, a battery is a chemical device consisting of one or more cells, in which chemical energy is converted into electricity and used as a source of power. Batteries are commonly defined with a positive terminal and a negative terminal.

Bollard: As used in this disclosure, a bollard is a heavy vertical stanchion used as an anchor point to anchor an object to a horizontal surface. Bollards are often called Samson posts.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid or horseshoe shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring.

Capped Tube: As used in this disclosure, a capped tube is a tube with one closed end and one open end.

Chevron: As used in this disclosure, chevron is a term that is used to describe an object that has the shape of a U or a V.

Clip: As used in this disclosure, a clip is a fastener that attaches to an object by gripping or clasping the object. A clip is typically spring loaded.

Correspond: As used in this disclosure, the term correspond is used as a comparison between two or more objects wherein one or more properties shared by the two or more objects match, agree, or align within acceptable manufacturing tolerances.

Cubicle: As used in this disclosure, a cubicle is a partitioned sub-space with a larger open space. Cubicles are often used to desks for office activities.

Diode: As used in this disclosure, a diode is a two terminal semiconductor device that allows current flow in only one direction. The two terminals are called the anode and the cathode. Electric current is allowed to pass from the anode to the cathode.

Extension Structure: As used in this disclosure, an extension structure is an inert physical structure that is used to extend the span of the distance between any two objects.

Force of Gravity: As used in this disclosure, the force of gravity refers to a vector that indicates the direction of the pull of gravity on an object at or near the surface of the earth.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Lateral Face: As used in this disclosure, lateral face refers to the surface of a prism structure that joins the ends of the prism.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Ledge: As used in this disclosure, a ledge is a horizontal surface that projects away from a vertical surface.

Limit Resistor: As used in this disclosure, a limit resistor is an electrical resistor that is used to limit the flow of electric current through an electrical circuit.

Loop: As used in this disclosure, a loop is the length of a first structure including, that is folded or curved to form a closed or nearly closed space such that a linear structure such as a second line, a cord or a hook can be inserted through the space formed within the first structure. Within this disclosure, the first structure is said to be looped around the linear structure.

Maintained Switch: A used in this disclosure, a maintained switch is a switch that maintains the position that was set in the most recent switch actuation. A maintained switch works in an opposite manner to a momentary switch.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Ring: As used in this disclosure, a ring is term that is used to describe a flat or plate-like structure through which an aperture is formed. Rings are often considered loops.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertical pole, post, or support. See beam and gusset and strut Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A decorative accessory comprising:

wherein the decorative accessory comprises a stanchion, a stanchion cap, a clip, and a festive illumination;

wherein the clip and the stanchion cap attach to the stanchion;

wherein the festive illumination installs in the stanchion;

wherein the decorative accessory is configured for use with a cubicle;

wherein the cubicle is further defined with a wall;

wherein the decorative accessory attaches to the wall of a cubicle such that the decorative accessory projects above the wall of the cubicle;

wherein one or more festive adornments are attached to the decorative support pole;

wherein the stanchion is an extension structure that separates the clip from the stanchion cap;

wherein the festive illumination is an electric circuit that illuminates the stanchion;

wherein the stanchion cap comprises a top piece, a plurality of lateral anchor points, and a superior anchor point;

wherein the plurality of lateral anchor points and the superior anchor point attach to the top piece;

wherein the top piece is further defined with an open end, a closed end, and a second lateral face.

2. The decorative accessory according to claim 1 wherein the stanchion cap is a headpiece;

wherein the stanchion cap attaches to the highest point of the stanchion;

wherein the stanchion cap serves as an anchor point for the one or more festive adornments.

3. The decorative accessory according to claim 2 wherein the clip is a spring-loaded structure;

wherein the clip attaches the bottom end of the stanchion to the cubicle wall.

4. The decorative accessory according to claim 3 wherein the clip attaches the stanchion to the cubicle wall such that the stanchion projects away from the cubicle wall in a direction opposite to but parallel with the direction of the force of gravity.

5. The decorative accessory according to claim 4 wherein the festive illumination is an electric circuit;

wherein the festive illumination is a lamp;

wherein the festive illumination illuminates the stanchion.

6. The decorative accessory according to claim 5 wherein the stanchion is a vertically oriented structure;

wherein the stanchion raises the stanchion cap above the cubicle wall.

7. The decorative accessory according to claim 6 wherein the stanchion comprises a bollard and a plurality of apertures;

wherein the plurality of apertures are formed in the bollard;

wherein the bollard is further defined with a first end, a second end, and a first lateral face.

8. The decorative accessory according to claim 7 wherein the bollard forms the extension structure that raises the stanchion cap above the cubicle wall.

9. The decorative accessory according to claim 8 wherein the plurality of apertures are a plurality of channels formed through the first lateral face of the bollard;

wherein the plurality of apertures display the illumination of the festive illumination.

10. The decorative accessory according to claim 9 wherein the top piece is a capped tube.

11. The decorative accessory according to claim 10 wherein the top piece is geometrically similar to the bollard;

wherein the first end of the bollard inserts into the open end of the top piece;

wherein the bollard supports the top piece above the cubicle wall.

12. The decorative accessory according to claim 11 wherein each of the plurality of lateral anchor points is a ring structure;

wherein the plurality of lateral anchor points attach to the second lateral face of the top piece.

13. The decorative accessory according to claim 12 wherein the superior anchor point is a loop;

wherein the superior anchor point is formed on the closed end of the top piece.

14. The decorative accessory according to claim 13 wherein a festive adornment selected from the one or more festive adornments will attach to an anchor point selected from the group consisting of the plurality of lateral anchor points and the superior anchor point.

15. The decorative accessory according to claim 14 wherein the clip comprises a cantilever V spring;

wherein the cantilever V spring attaches to the second end of the bollard;

wherein the cantilever V spring attaches the second end of the bollard to the cubicle wall.

16. The decorative accessory according to claim 15 wherein the decorative ledge;

wherein the decorative ledge is a ring;

wherein the bollard inserts through the decorative ledge such that the decorative ledge: a) is adjacent to the cantilever V spring; and, b) is proximal to the first end of the bollard relative to the cantilever V spring.

17. The decorative accessory according to claim 16 wherein the festive illumination comprises a plurality of LEDs, a limit resistor, a battery, and a switch;

wherein each of the plurality of LEDs forms an illuminating element of the festive illumination;

wherein the limit resistor is an electrical device installs in series with the plurality of LEDs;

wherein the limit resistor limits the flow of electricity through the plurality of LEDs;

wherein the battery generates the electricity required to power the plurality of LEDs;

wherein the switch is an electrical device;

wherein the switch controls the flow of electricity from the battery to the plurality of LEDs and the limit resistor.

18. The decorative accessory according to claim 17 wherein there is a one to one correspondence between the plurality of LEDs and the plurality of apertures;

wherein each LED selected from the plurality of LEDs installs in an aperture selected from the plurality of apertures such that the illumination of the selected LED is visible through the selected aperture.

* * * * *